(12) United States Patent
Yamada et al.

(10) Patent No.: US 9,148,020 B2
(45) Date of Patent: Sep. 29, 2015

(54) METHOD OF CONTROLLING A BATTERY, COMPUTER READABLE RECORDING MEDIUM, ELECTRIC POWER GENERATION SYSTEM AND DEVICE CONTROLLING A BATTERY

(75) Inventors: Yohei Yamada, Moriguchi (JP); Hayato Ikebe, Moriguchi (JP); Souichi Sakai, Moriguchi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 812 days.

(21) Appl. No.: 13/425,096

(22) Filed: Mar. 20, 2012

(65) Prior Publication Data

US 2012/0235484 A1    Sep. 20, 2012

Related U.S. Application Data

(63) Continuation of application No. PCT/JP2011/051563, filed on Jan. 27, 2011.

(30) Foreign Application Priority Data

Jan. 27, 2010  (JP) ................................. 2010-015236

(51) Int. Cl.
*H02J 1/00* (2006.01)
*H02J 7/34* (2006.01)
*H02J 3/38* (2006.01)
(Continued)

(52) U.S. Cl.
CPC . *H02J 3/383* (2013.01); *H02J 1/00* (2013.01); *H02J 3/32* (2013.01); *H02J 7/00* (2013.01); *H02J 7/34* (2013.01); *H02J 7/35* (2013.01);
(Continued)

(58) Field of Classification Search
CPC ................ H02J 1/00; H02J 7/00; H02J 7/34; H02J 7/35; H02J 3/383; H02J 3/32; Y10T 307/50; Y02E 70/30; Y02E 10/563; Y02E 10/566
USPC ................................................ 307/43, 44, 48
See application file for complete search history.

(56) References Cited

U.S. PATENT DOCUMENTS 7,110,273 B2 * 9/2006 Abe et al. ......................... 363/71
2005/0243584 A1   11/2005 Abe et al.

FOREIGN PATENT DOCUMENTS

JP        2001-5543        1/2001
JP        2002-17044       1/2002
(Continued)

OTHER PUBLICATIONS

International Search Report and Written Opinion mailed Apr. 19, 2011, directed to International Application No. PCT/JP2011/051563; 14 pages.

*Primary Examiner* — Hal Kaplan
(74) *Attorney, Agent, or Firm* — Morrison & Foerster LLP

(57) ABSTRACT

The method of controlling a battery storing electric power generated by a power generator generating electric power using renewable energy comprises detecting an amount of electric power generated by the power generator at a first time and a second time that is prior to the first time; computing a rate of increase or decrease of the amount of electric power between the first time and the second time; computing a target output value for the electric power to be supplied to an electric power transmission system based on the rate, and supplying to the electric power transmission system electric power corresponding to the target output value from at least one of the power generator and the battery.

15 Claims, 16 Drawing Sheets

(51) Int. Cl.
  *H02J 7/00* (2006.01)
  *H02J 3/32* (2006.01)
  *H02J 7/35* (2006.01)
(52) U.S. Cl.
  CPC .............. *Y02E 10/563* (2013.01); *Y02E 10/566* (2013.01); *Y02E 70/30* (2013.01); *Y10T 307/50* (2015.04)

(56) References Cited

FOREIGN PATENT DOCUMENTS

| | | |
|---|---|---|
| JP | 2005-318705 | 11/2005 |
| JP | 2007-330017 | 12/2007 |
| JP | 2008-295208 | 12/2008 |

* cited by examiner

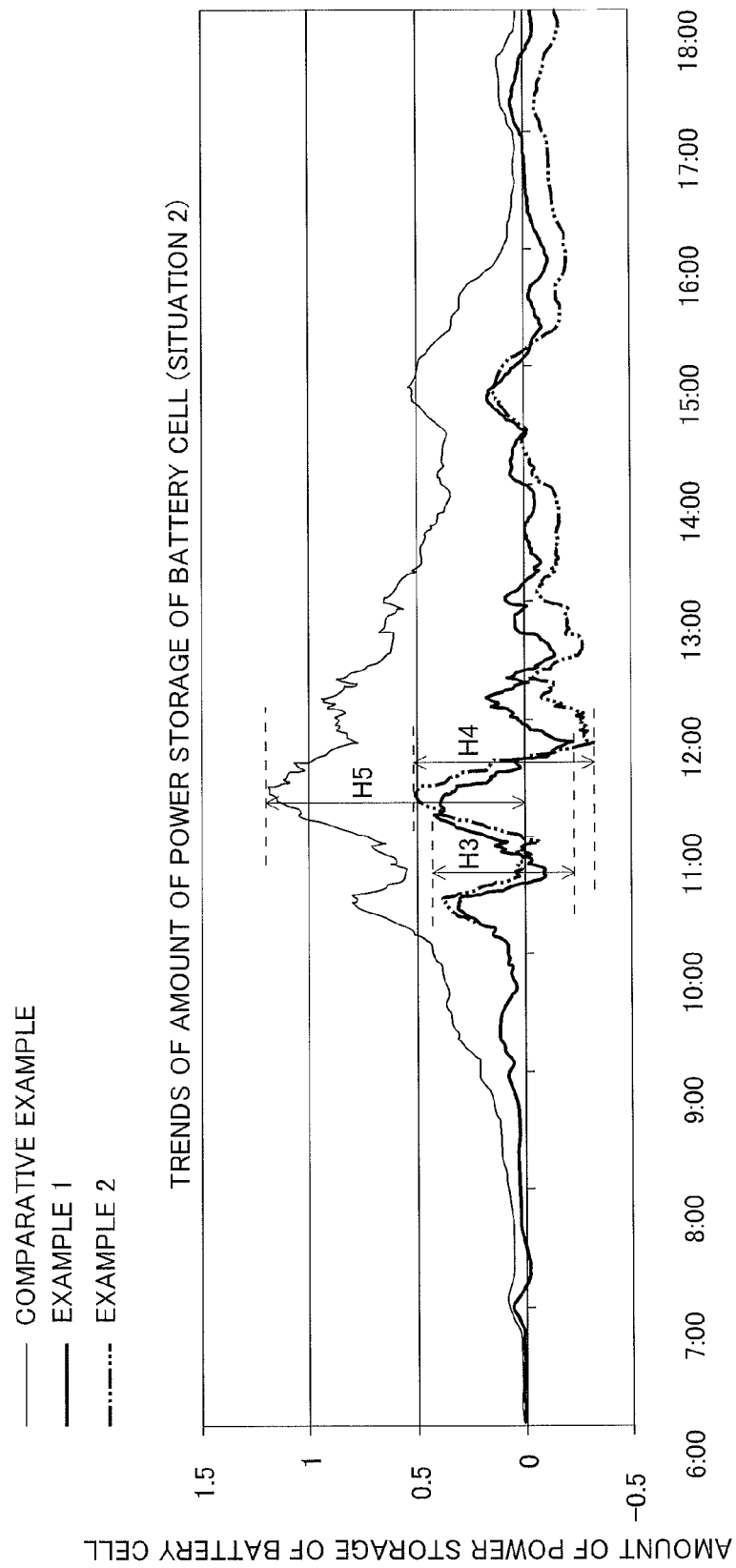

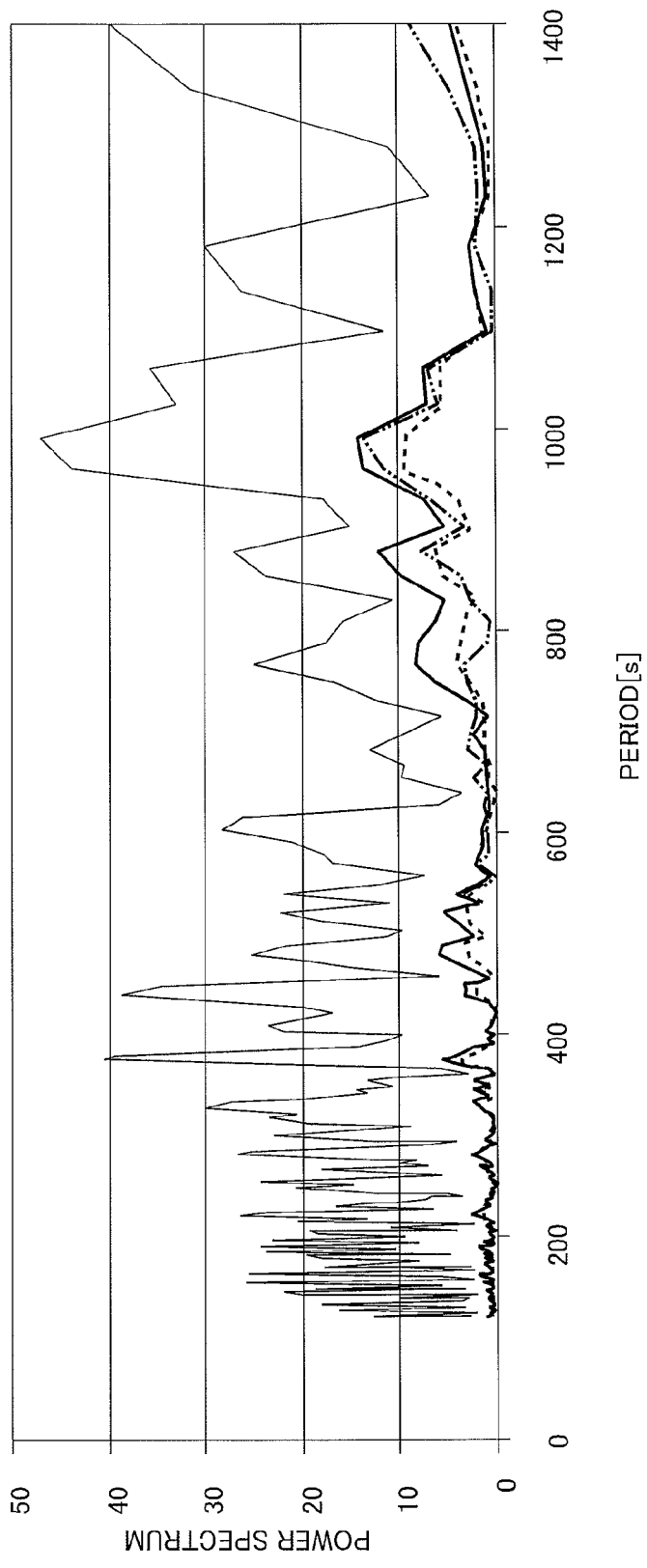

METHOD OF CONTROLLING A BATTERY, COMPUTER READABLE RECORDING MEDIUM, ELECTRIC POWER GENERATION SYSTEM AND DEVICE CONTROLLING A BATTERY

CROSS REFERENCE TO RELATED APPLICATIONS

This application is a continuation of International Application No. PCT/JP2011/051563, filed Jan. 27, 2011, which claims priority from Japanese Patent Application No. 2010-015236, filed Jan. 27, 2010, the entire contents of which are incorporated herein by reference.

FIELD OF INDUSTRIAL USE

The present invention relates to a method of controlling a battery, a computer readable recording medium, an electric power generation system and a device controlling a battery.

PRIOR ART

In recent years, the number of instances where power generators (solar cells etc.) utilizing natural energy such as wind power or sunlight are connected to consumer homes in receipt of a supply of alternating power from an electricity substation has increased. These types of power generators are connected to the power grid subordinated to the substation, and power generated by the power generators is output to the power consuming devices side of the consumer location. Moreover, the superfluous electric power, which is not consumed by the power consuming devices in the consumer location, is output to the power grid. The flow of this power towards the power grid from the consumer location is termed "counter-current flow", and the power output from the consumer to the power grid is termed "counter-current power".

In this situation, the power suppliers such as the power companies and the like have a duty to ensure the stable supply of electric power and need to maintain the stability of the frequency and voltage of the overall power grid, including the counter-current power components. For example, the power supply companies maintain the stability of the frequency of the overall power grid by a variety of methods in correspondence with the size of the fluctuation period. Specifically, in general, in respect of a load component with a variable period of over ten minutes, an economic dispatching control (EDC) is performed to enable output sharing of the generated amount in the most economical manner. This EDC is controlled based on the daily load variation expectation, and it is difficult to respond to the increases and decreases in the load fluctuation from minute to minute and second to second (the components of the fluctuation period which are less than over ten minutes). In that instance, the power companies adjust the amount of power supplied to the power grid in correspondence with the minute fluctuations in the load, and perform plural controls in order to stabilize the frequency. Other than the EDC, these controls are called frequency controls, in particular, and the adjustments of the load variation components not enabled by the adjustments of the EDC are enabled by these frequency controls.

More specifically, for the components with a fluctuation period of not more than approximately 10 seconds, their absorption is enabled naturally by means of the endogenous control functions of the power grid itself. Moreover, for the components with a fluctuation period of about 10 seconds to the order of several minutes, they can be dealt with by the governor-free operation of the power generators in each generating station. Furthermore, for the components with a fluctuation period of the order of several minutes to tens of minutes, they can be dealt-with by load frequency control (LFC). In this load frequency control, the frequency control is performed by the adjustment of the generated power output of the generating station for LFC by means of a control signal from the central power supply command station of the power supplier.

However, the output of power generators utilizing natural energy may vary abruptly in correspondence with the weather and such like. This abrupt fluctuation in the power output of this type of power generators applies a gross adverse impact on the degree of stability of the frequency of the power grid they are connected to. This adverse impact becomes more pronounced as the number of consumers with power generators using natural energy increases. As a result, in the event that the number of consumers with power generators utilizing natural energy increases even further henceforth, there will be a need arising for sustenance of the stability of the power grid by the control of the abrupt variation in the output of the power generators.

In relation to that, there have been proposals, conventionally, to provide power generation systems with batteries to enable the storage of electricity resulting from the power output generated by power generators, in addition to the power generators utilizing natural energy, in order to control the abrupt fluctuation in the power output of these types of power generators. Such a power generation system was disclosed, for example, in Japanese laid-open patent publication No. 2001-5543.

In the Japanese laid-open published patent specification 2001-5543 described above, there is the disclosure of a power grid provided with solar cells, and invertors which are connected to both the solar cells and the power grid, and a battery which is connected to a bus which is also connected to the inverter and the solar cells. In the disclosure of Japanese laid-open published patent specification 2001-5543 by computing the moving average of the prior generate power output (the target output value), power with this moving average value is caused to be output from the inverter to the power grid, and the just the difference between the moving average value and the generated power output of the solar cell is provided by the performance of the charge and discharge of the battery, and smoothing control is performed by the suppression of the fluctuations in the power which flows counter current to the power grid. By this means, the suppression of the adverse impact on the frequencies and the like of the power grid are enabled.

PRIOR ART REFERENCES

Patent References

Patent Reference #1: Japanese laid-open published patent specification 2001-5543

OUTLINE OF THE INVENTION

Problems to be Solved by the Invention

However, because the moving average value (the target output value) is computed from the generated prior power output data, the value of the moving average value reflects the values of the prior generated power in this power generation system, and approximates the values of the prior generated power values. For this reason, the trends of the moving average value exhibit hysteresis as a result of the overall impact of the prior generated power output values (delay) trends. In this situation, an overall slippage is generated corresponding to the difference between that delayed moving average value and the actual generated power output. In the event that the slippage between the trends of the actual generated power output and the trend of the moving average value is great, the amount of the charging and discharging of the battery, which corresponds to the difference between the actually generated power output and the moving average value, and the depth of the degree of charge and discharge become greater overall, and as a result, there is the problem that the lifetime of the battery comprised of a secondary battery and the like is reduced.

This invention was conceived of to resolve the type of problems described above, and one object of this invention is the provision of a power supply method enabling a contrivance at lengthening the lifetime of the battery, while suppression the effects on the power grid caused by the fluctuations in the generated power from the power generator, as well as the provision of a computer readable recording media and a power generation system.

SUMMARY OF THE INVENTION

In order to achieve the objectives described above, a method of controlling a battery storing electric power generated by a power generator generating electric power using renewable energy of the present invention, comprising, detecting an amount of electric power generated by the power generator at a first time and a second time that is prior to the first time, computing a rate of increase or decrease of the amount of electric power between the first time and the second time, computing a target output value for the electric power to be supplied to an electric power transmission system based on the rate, and supplying to the electric power transmission system electric power corresponding to the target output value from at least one of the power generator and the battery.

A computer-readable recording medium which records a control programs for causing one or more computers to perform the steps of the present invention comprising, detecting an amount of electric power generated by the power generator at a first time and a second time prior to the first time, computing a rate of increase or decrease of the amount of electric power between the first time and the second time, computing a target output value for the electric power to be supplied to an electric power transmission system based on the rate, and supplying to the electric power transmission system electric power corresponding to the target output value from at least one of the power generator and the battery.

An electric power generation system of the present invention, comprising, a power generator configured to generate electric power using renewable energy, a battery configured to store electric power generated by the power generator, a detector configured to detect the amount of electric power generated by the power generator at a first time and a second time prior to the first time, a controller configured to compute a rate of increase or decrease of the amount of electric power between the first time and the second time, to compute a target output value for the electric power to be supplied to an electric power transmission system based on the rate, to supply to the electric power transmission system electric power corresponding to the target output value from at least one of the power generator and the battery.

BENEFITS OF THE INVENTION

By means of the present invention, the setting of a target output value is enabled such that the trend of the target output value approximates the trend of the actual generated power output, based on not only the generated power output of the power generator, but also the slope to increase or decrease of the generated power. By this means, because the overall slippage between the target output value and the actually generated power output is reduced in order to smooth the fluctuations in the generated power output, and when the charge and discharge of the battery is performed in respect of only the difference between the target output value and the actual generated power output, the reduction in the amount of charge and discharge of the battery and the depth of the charge and discharge is enabled. As a result, a contrivance at lengthening the lifetime of the battery is enabled, while suppression the effects on the power grid caused by the fluctuations in the generated power from the power generator.

BRIEF EXPLANATION OF THE FIGURES

FIG. 17 is a graph showing the trends (situation 2) of the amount of power storage of the battery cell of the example 1, example 2 and the comparative example.

FIG. 18 shows a graph of the FFT analysis results (situation 2) of the example 1, example 2 and the comparative example.

BEST MODE OF EMBODYING THE INVENTION

Hereafter the embodiments of the present invention are explained based on the figures.

Embodiment 1

Figure 1:
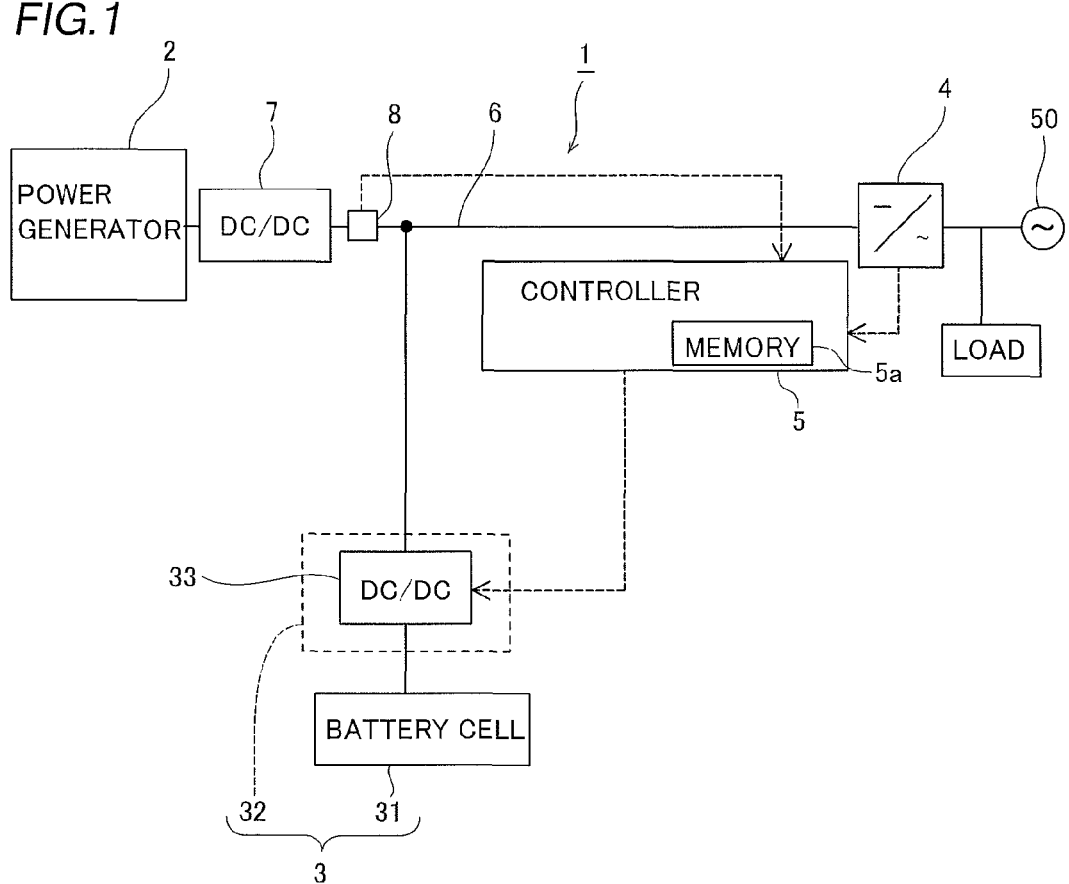
FIG. 1 is a block diagram showing the configuration of the power generation system of the first embodiment of the invention.
Figure 2:
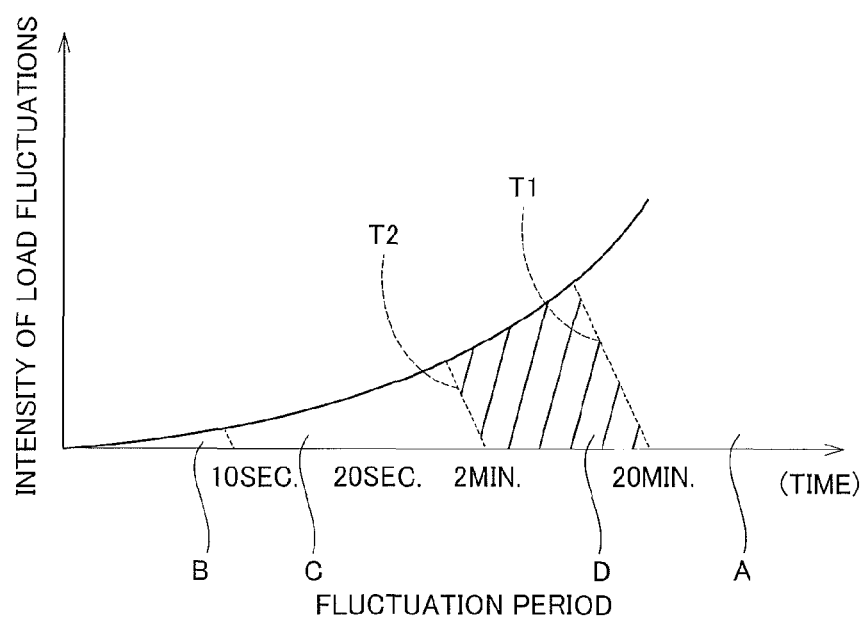
FIG. 2 is a drawing in order to explain the relationship of the intensity of the load fluctuations output to the power grid and the period of the fluctuations.
Figure 3:
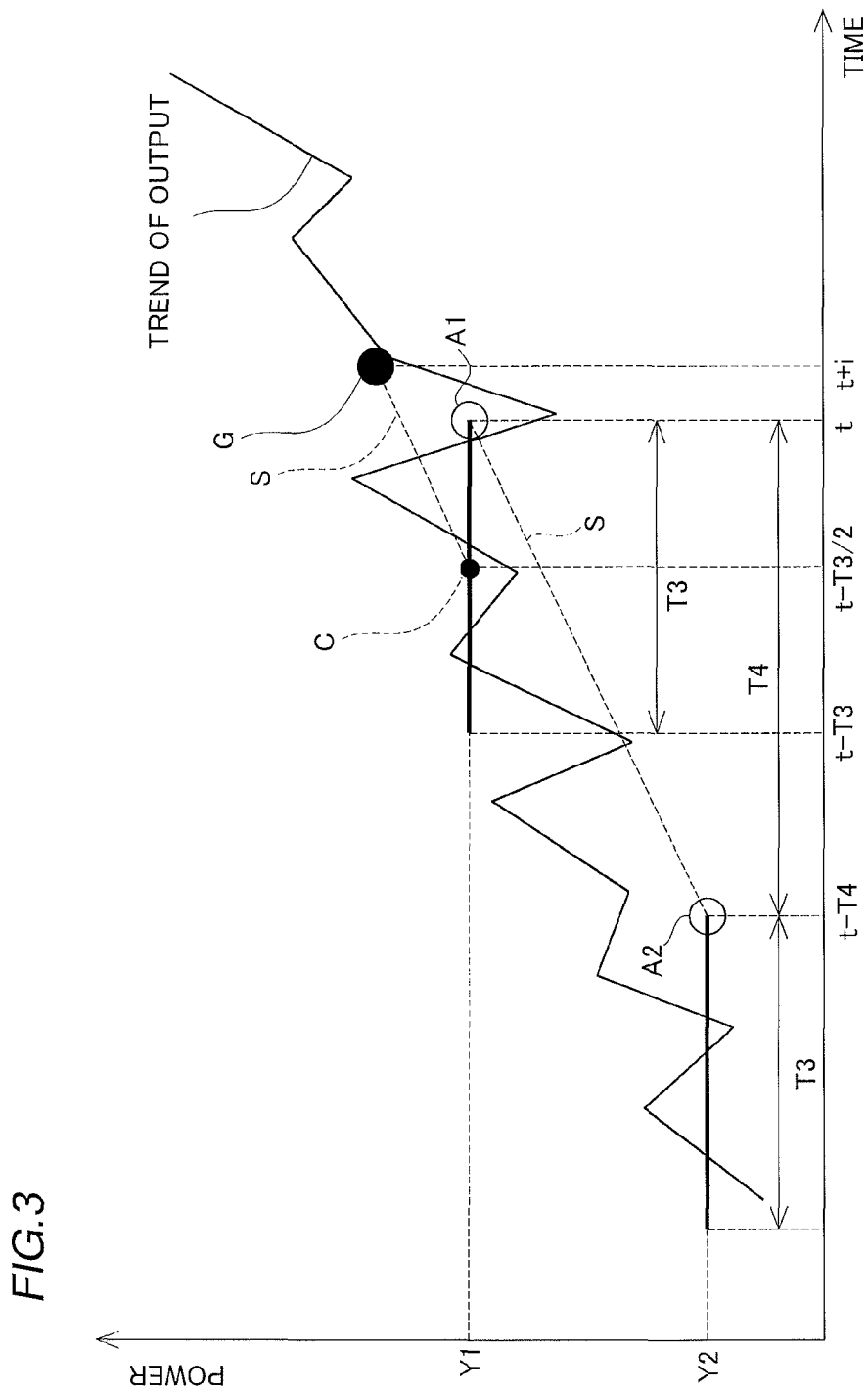
FIG. 3 is a drawing in order to explain the computation method for the target output value by means of the power generation system of the first embodiment shown in FIG. 1.

Firstly, the configuration of the power generation system of the first embodiment of the invention is explained while referring to FIG. 1~3.

As shown in FIG. 1, the power generation system 1 has the power generator 2 comprised of a solar cell electrical generator employing sunlight, connected to the power grid 50. The power generation system 1 provides an battery 3 enabling electrical storage of the power generated by means of the power generator 2, and a power output unit 4 including an inverter which outputs electrical power stored by battery 3 as well as power generated by means of the power generator 2 to the power grid 50, and a controller 5 controlling the charging and discharging of the battery 3. Now, the power generator 2 is preferably a generator utilizing renewable energy and, for example, may employ a wind power generator and the like.

The DC-DC converter 7 is connected in series on the bus 6 connecting the power generator 2 and the power output unit 4. The DC-DC converter 7 converts the direct current voltage of the power generated by the power generator 2 to a fixed direct current voltage (In this embodiment, approximately 260 V) and outputs to the power output unit 4 side. Moreover, the DC-DC converter 7 has a so-called a maximum power point tracking (MPPT) control function. The MPPT function is a function where by the operating voltage of the power generator 2 is automatically adjusted to maximize the power generated by the power generator 2. A diode is provided (not shown in the figures) between the power generator 2 and the DC-DC converter 7 so as to prevent the reverse flow of the current to the power generator 2.

The battery 3 includes the battery cell 31 connected in parallel with the bus 6, and the charge and discharge unit 32 which performs the electrical charge and discharge of the battery cell 31. As the battery cell 31, a high charge and discharge efficiency ratio rechargeable battery with low natural discharge (e.g. a lithium ion battery cell, a Ni-MH battery cell and the like) are employed. Moreover, the voltage of the battery cell 31 is approximately 48 V.

The charge and discharge unit 32 has a DC-DC converter 33, and the bus and the battery cell 31 are connected via the DC-DC converter 33. When charging, the DC-DC converter 33 supplies electrical power from the bus 6 side to the battery cell 31 side by reducing the voltage of the bus 6 to a voltage suitable for charging the battery cell 31. Moreover, when discharging, the DC-DC converter 33 discharges the electrical power from the battery cell 31 side to the bus 6 side by raising the voltage from the voltage of the battery cell 31 to the vicinity of the voltage of the bus 6 side.

The electrical controller 5 performs the charge and discharge control of battery cell 31 by controlling the DC-DC converter 33. In order to smooth the value of the power output to the power grid 50, irrespective of the generated power output of the power generator, the controller 5 sets a target output value to the power grid 50. The controller 5 controls the charge and discharge of the battery cell 31 so that the power output to the power grid 50 becomes the target output value. In other words, in the event that the power output by the power generator 2 is greater than the target output value, the controller 5 not only controls the DC-DC converter 33 to charge the battery cell 31 with the excess electrical power, in the event that the power output by the power generator 2 is less than the target output value, the controller 5 controls the DC-DC converter 33 to discharge the battery cell 31 to make up for the shortfall in the electrical power.

Moreover, the controller 5 acquires the power output data from the detection unit 8 provided on the output side of DC-DC converter 7. The detection unit 8 detects the power output of the power generator 2 and transmits the power output data to the controller 5. The controller 5 acquires the power output data from the detection unit 8 at specific detection time intervals. Here, the controller 5 acquires the power output data every 60 seconds. Now if the detection time interval of the power output data is too long or too short, the fluctuation in the power output cannot be detected accurately, it is set at an appropriate value in consideration of the fluctuation period of the power output of the power generator 2.

The controller 5, recognizes the difference between the actual power output by the power output unit 4 to the power grid 50, and target output value by acquiring the output power of the electrical power output unit 4, and by this means, the controller 5 enables feedback control on the electrical charging and discharging by the charge and discharge unit 32 such that the power output from the power output unit 4 becomes that of the target output value.

Next, the charge and discharge control method of the battery cell 31 by the controller 5 is explained.

As described above, the controller 5 controls the charge and discharge of the battery cell 31 so that the total of the power generated by the power generator 2, and the amount charged or discharged to/from the battery cell 31 becomes the target output value. The target output value is computed by the controller 5 using the moving average method, but if the moving average value computed using the moving averages method is used, as is, a slippage with respect to the actual power output by the power generator 2 is generated. For this reason, in this embodiment, the controller 5 in computing the target output value, does not use the moving average value as computed by the moving averages method, as is, but computes the target output value from the moving average and the slope to increase/decrease of the generated power output.

The moving average method is a computation method for the target output value for a point in time, wherein the average value for the power output by the power generator 2 in a period from that point back to the past is computed. Hereafter, the period used in order to acquire power output data to use in the computation of the target output value is called the sampling period.

As a specific value for the sampling period, in this embodiment, it is set at approximately 20 minutes. In this situation, because the controller 5 acquires the power output data approximately every 60 seconds, the target output value is computed from the average value of 20 data on the power output in the last 20 minute interval.

Next, the fluctuation period range where the suppression of fluctuation is mainly performed by the charge and discharge control of the controller 5 is explained while referring to FIG. 2. As shown in FIG. 2, the control methods vary with the fluctuation periods to enable dealing with it. The load fluctuation periods which load frequency control (LFC) can deal with are shown in domain D (The domain shown hatched). Moreover, the load fluctuation periods which EDC can deal with are shown in domain A. Now domain B is a domain in which the load fluctuation can be absorbed naturally by the endogenous controls of the power grid 50. Furthermore, domain C is a domain which can be dealt with by the governor free operation of each of the power generators of the generating stations. Here, the load fluctuation period which can be dealt with by LFC at the border of domain D and domain A becomes the upper limit period T1, and the load fluctuation period which can be dealt with by load frequency control at the border of domain C and domain D becomes the lower limit period T2. The upper limit period T1 and the lower limit period T2 are not fixed periods, but some examples of the fluctuations due to the size of the load fluctuations as shown in FIG. 2. In addition, the time of the fluctuation period shown in the figures will vary with the architecture of the power grid. In the first embodiment, the focus is on the fluctuation periods in the range of domain D (the domain which can be dealt with by LFC) which is the range where EDC, the endogenous control of the power grid 50 or the governor free operation cannot deal with, and the objective is to suppress them.

Next, the computation method of the target output value by controller 5 is explained while referring to FIG. 3.

The controller 5 acquires the generated power output data by detecting the generated power output for each detection time interval (i seconds), and sequentially stores in memory 5a. Moreover, on each occasion of acquiring new generated power output data (for each detection time interval), the controller 5 computes a moving average based on the generated power data acquired from the current point in time (Time t) to include data in the prior sampling period T3 (Time t-T3~to time t). These moving averages are stored sequentially in memory 5a. In other words, the values of the moving averages are values which are computed based on prior generated power output. For this reason, the moving average values represent a trend sliding away from the current generated power output to an overall prior generated power output trend (a delay or hysteresis). Now, for the purposes of simplicity FIG. 3 shows only the moving average values for two points in time.

Here, in order to correct the shift between the moving average values and the actual generated power output, the trend of the generated power output is estimated by the controller 5 based on the increase/reduction trend of the moving average values, and set as the target output value.

Specifically, the controller 5, in order to compute the target output value G for a time of t+i, based on the current time t, firstly, computes the trend S between the latest moving average value A1 (Time t, power output value Y1) for the current point in time t, and the moving average value A2 (Time t-T4, power output value Y2) for a specific time interval T4 before the present time (t-T4).

Then, the controller 5 computes, in respect of the center point (t-T3/2) of the moving average time interval (time t-T3~time t) which was used to compute the moving average value A1 for the time t, the power output value for the time t+i with a trend of the increase/decrease ratio slope S from the point C (time t-T3/2, Power output value Y1) having a moving average value A1 and power output Y1, and designates this as the target output value G for the time t+i. By using the center point of the moving average interval (sampling period (20 minutes)) in order to compute the moving average value A1 computed immediately before time t+1 as the increase/decrease S starting point on the occasion of computation of the target output value G, the trend of the target output value G is corrected so as not to be delayed from the actual trend of the generated power output. For this reason, the target output value G, while fluctuating up and down repeatedly from minute to minute and second to second, the trend is set from a trend point near the center of the trends of the actual power output. In relation to the trend of this target output value G, an explanation is provided later while showing the results of a simulation. Moreover, the time interval T4 between the time points of the two moving average values (Moving average values A1 and A2) in order to compute the slope S is a period not less than the upper limit period T1 of the fluctuation periods which the load frequency control can deal with. Here, the time interval T4 is set at 20 minutes.

As described above, the controller 5 computes the target output value G for each detection time interval based on the slope S between the moving average value A1 and the moving average value A2, and performs the charge and discharge control of battery cell 31 so that the total of the actual generated power output of the power generator 2 and the amount of charge and discharge of battery cell 31 become the target output value.

The power generation system 1 with the configurations described above enables the achievement of the following benefits.

The controller 5 computes the target output value in order to smooth the fluctuations in the generated power output, based on not only the generated power output of the power generator 2, but also on the slope to increase or decrease of the generated power output. By means of the configuration described above, the setting of a target output value wherein the target output value is approximated to the trends in the actual generated power output based on the slope of the generated power output to increase or decrease. By this means, because the slippage between the target output value, in order to smooth the fluctuations in the generated power output, and the actual generated power output are reduced overall, when the charge and discharge of the battery cell 31 is performed in respect of only the difference between the target output value and the actual generated power output, the reduction in the amount of charging and discharging of the battery cell 31 and the depth of the charge and discharge is enabled. By this means, a contrivance at lengthening the lifetime of battery cell 31 is enabled, while suppressing the impact to the power grid 50 caused by the fluctuations in the generated power output of the power generator 2 is also enabled. Moreover, because the depth of the charge and discharge can be reduced compared with conventionally (where the moving average was used as the target output value), the performance of charge and discharge control using a reduced capacity battery cell, compared with conventionally, is enabled.

Furthermore, the controller 5 sets the target output value by computing the power output based on the slope to increase or decrease of the moving average value. By this means, in distinction from the conventional situation where the computed target output value to smooth the power output based on only the generated power, the target output value can easily be computed based on the slope to increase or decrease of the generated power output.

Moreover, the controller 5 computes the target output value G based on the moving average value A1 and the slope S, which is the slope for the generated power output of the power generator to increase or decrease at a slope S between the moving average value A1 and the moving average value A2 at a point in time earlier than moving average value A1. By enabling this type of configuration, the setting of a target output value G by the easy estimation of the trend of the generated power output, based on the slope S which is the difference between the moving average values at two points in time (The interval between moving average A1 and moving average A2) is enabled.

Furthermore, the controller 5 computes the target output value G based on the slope S between the moving average value A1, and the moving average value A2 which is at a previous period, which in relation to the acquisition point of the moving average value A1, is a period just above the upper limit period of the fluctuation periods which load frequency control can deal with. By the computation of the target output value G based on the slope S between the moving average value A1 and the moving average value A2 with this type of time interval there between, a target output value G can be set so as to suppress the components of the fluctuation periods which the load frequency control can deal with.

Moreover, the controller 5 enables the setting of the target output value G so as to approximate the trend of the actual generated power output, by setting a target output value G based on the generated power output when the generated power output is transitioning with a slope S on the increase or decrease thereof at point C of a moving average value A1 with a power output value Y1 which is the center point in a moving average interval used in order to compute the moving average value A1.

Furthermore, the controller 5 can reduce the fluctuation in the fluctuation periods which the load frequency control can deal with in the fluctuations of the target output value computed based on the moving average value A1 and the moving average value A2, by setting the sampling periods to not less than the upper limit period of the fluctuation periods which load frequency control can deal with.

Figure 4:
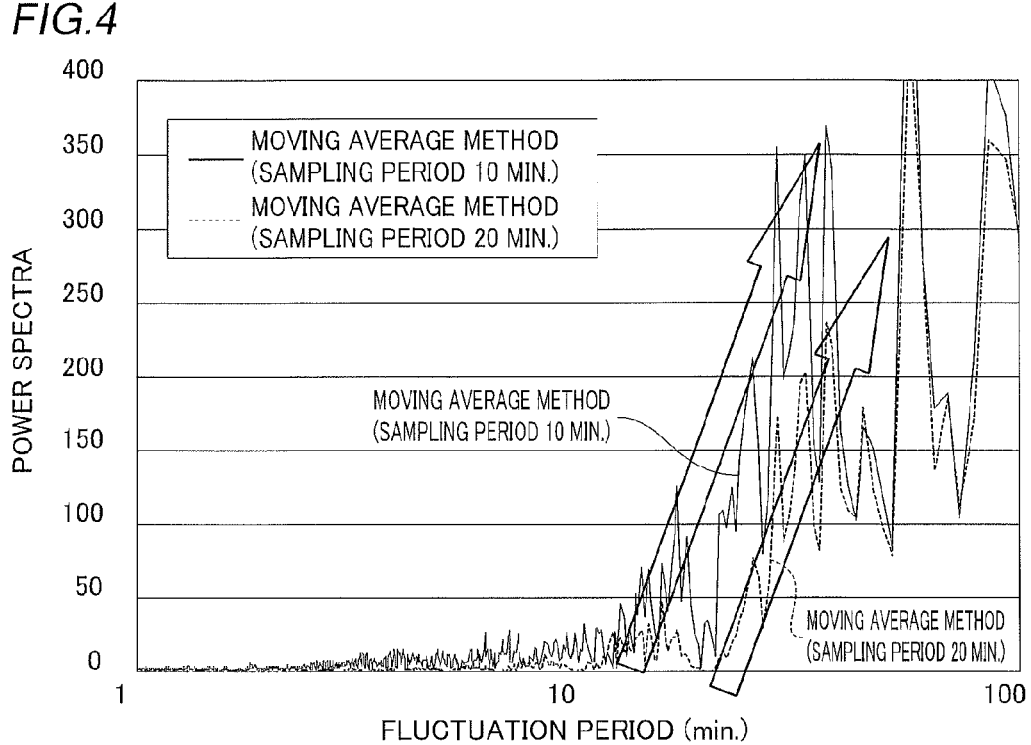
FIG. 4 is a drawing in order to explain the sampling periods in the charge and discharge control.
Figure 5:
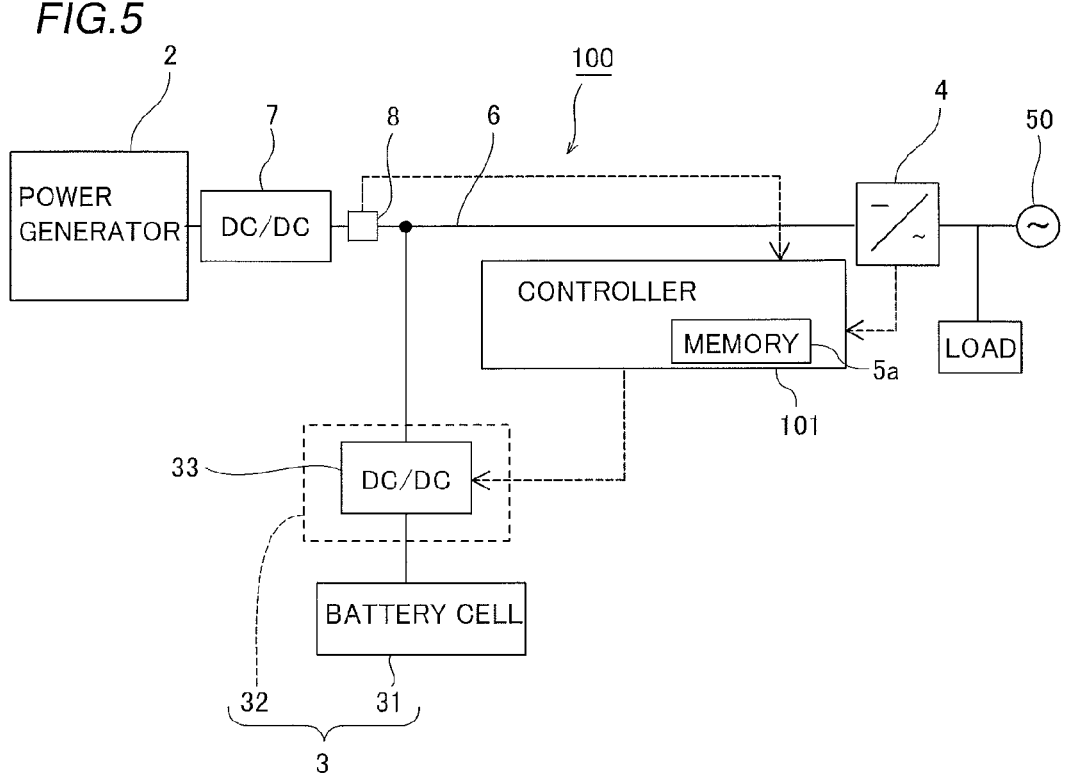
FIG. 5 is a block diagram showing the configuration of the power generation system of the second embodiment of the invention.

Next, the results of an investigation of the sampling periods of the moving average method are explained while referring to FIG. 4. FIG. 4 shows the results of the FFT analysis of the generated power data when the sampling period which is the acquisition period of the data on the amount of the power generated was 10 minutes, and the results of the FFT analysis of generated power data when the sampling period which is the acquisition period of the data on the amount of power generated was 20 minutes.

As shown in FIG. 4, when the sampling period was 10 minutes, while the fluctuations in respect of a range of up to 10 minutes of a fluctuation period could be suppressed, the fluctuations in a range of fluctuation periods which were not less than 10 minutes were not suppressed well. Moreover, when the sampling period was 20 minutes, while the fluctuations in respect of a range of up to 20 minutes of a fluctuation period could be suppressed, the fluctuations in a range of fluctuation periods which were not less than 20 minutes was not suppressed well.

Therefore, it can be understood that there is a good mutual relationship between the size of the sampling period, and the fluctuation period which can be suppressed by the electrical charge and discharge control. For this reason, it can be said that by setting the sampling period, the range of the fluctuation period which can be controlled effectively changes. In that respect, in order to suppress parts of the fluctuation period which can be addressed by the load frequency control which is the main focus of this system, it can be appreciated that in order that sampling periods which are not less than the fluctuation period corresponding to what the load frequency control can deal be set, in particular, it is preferable that they be set from the vicinity of the latter half of T1~T2 (The vicinity of longer periods) to periods with a range not less than T1. For example, in the example in FIG. 2, by utilizing a sampling period of not less than 20 minutes, it can be appreciated that suppression of most of the fluctuation periods corresponding to the load frequency control is enabled.

Embodiment 2

Next, an explanation is provided concerning the power generation system 100 of the second embodiment of the present invention. In this embodiment, unlike in embodiment 1, an example where the sampling periods are made longer when the fluctuations in the generated power are great is explained.

The power generation system 100 provides a controller 101 instead of the controller 5 of embodiment 1. The configuration, other than the controller 101, is the same as the power generation system 1 of embodiment 1.

When the fluctuations in the generated power are within a specific range, the controller 101 computes the target output value by setting the sampling period at 20 minutes, and in order to compute the slope of the moving average values, the time interval between the moving average values is set at 20 minutes. Moreover, when the fluctuations in the generated power output are outside a specific range, the controller 101 computes the target output value by not only extending the sampling period to 40 minutes, the time interval between the moving averages is set at 20 minutes. The determination of whether the fluctuations in the generated power output are in a specific range or not is performed by a determination of whether the amount of fluctuation in the actual power generated in a 10 minute period is not less than −0.7 kW or not more than 0.7 kW, or not. In other words, if the difference between latest power generated and the power generated 10 minutes earlier are computed successively, a determination is made as to whether the difference is not less than −70 W or not more than 70 W.

Moreover, in the state where the sampling period is extended to 40 minutes, when the fluctuations in the generated power output in the state of being within a specific range for a specific time period (30 minutes in embodiment 2) in continuity, the controller 101 returns the sampling period to 20 minutes. In relation to the controls, other than the switchover of the sampling period in the charge and discharge control (the method of computing the target output value and the like), they are the same as described in embodiment 1 above.

Figure 6:
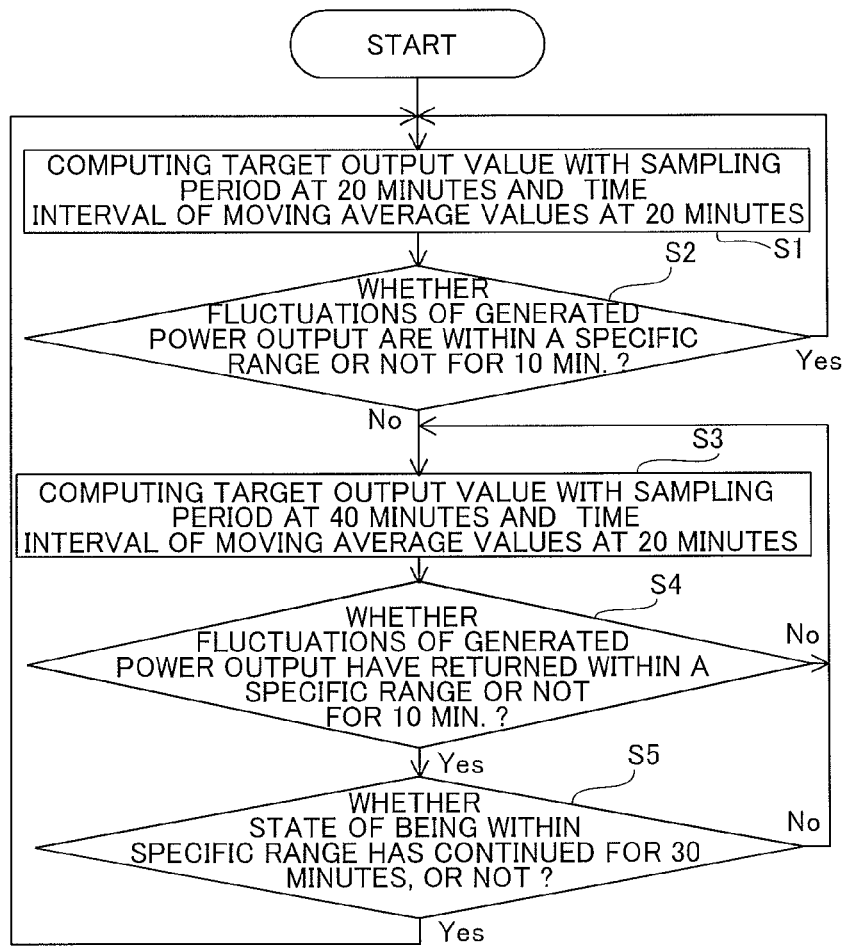
FIG. 6 is a flow chart in order to explain the flow of the control of the charge and discharge control of the power generation system in the second embodiment shown in FIG. 5.

Next, an explanation is provided of the flow of control of the change-over control of the sampling period of the power generation system 100, while referring to FIG. 6.

Firstly, in Step S1, the controller 101 computes the target output value with the sampling period at 20 minutes, and the time interval between the moving average values at 20 minutes. Then in Step S2, the controller 101 makes a determination as to whether the fluctuations of the generated power output are within a specific range or not. In the event that the fluctuations on the generated power output are within the specific range, the controller 101 returns to Step S1, and performs charge and discharge control with a sampling period of 20 minutes.

In the event that the fluctuations in the generated power output are not within the specific range, in Step S3, the controller 101 computes the target output value with the sampling period to 40 minutes, and the time interval of the moving average values at 20 minutes. In Step S4, the controller 101 makes a determination, with the sampling period at 40 minutes, as to whether the fluctuations of the generated power output have returned to within a specific range or not. In the event that the fluctuations in the generated power output have not returned to within the specific range, the controller 101 returns to Step S3, and performs charge and discharge control with a sampling period of 40 minutes.

In the event that the fluctuations in the generated power output have returned to within the specific range, in Step S5, the controller 101 makes a determination as to whether the state of being within the specific range has continued for 30 minutes, or not. In the event that the fluctuations in the generated power output have not continued within the specific range for 30 minutes (The situation where the fluctuations in the generated power output exhibited an out-of-range event within the 30 minutes), the controller 101 returns to Step S3, and performs charge and discharge control with a sampling period of 40 minutes. Moreover, in the event that the state continued for 30 minutes, the controller 101 returns to Step S1, and performs charge and discharge control with the sampling period returned to 20 minutes.

The power generation system 100 of the present embodiment enables the derivation of the following benefits from the configuration described above.

In the event that the fluctuations in the generated power output are small, the controller 101 not only computes the moving average value A1 and moving average value A2 with a sampling period of 20 minutes, in the event that the fluctuations in the generated power output are great, the controller 101 computes the moving average value A1 and moving average value A2 with a sampling period of 40 minutes. By means of this type of configuration, because the computation interval of the moving average values (the moving average value A1 and moving average value A2) becomes longer, the effect of the fluctuations of the generated power output on the moving average values becomes less. By this means, and by computing the target output value based on the moving average value A1 and moving average value A2 with a longer period length, even of the fluctuations in the generated power output are great, because the computation of the target output value based on the computed slope between the moving average value A1 and moving average value A2 is enabled without being greatly affected by the large fluctuations in the generated power output, the computation of target output value without being swayed by the large fluctuations in the generated power output is enabled. By this means, even when the fluctuations in the generated power output are great, sufficient smoothing can be performed, in addition to, reducing the charge and discharge amount and depth of charge and discharge of battery 3, enabling a contrivance at lengthening the lifetime of battery 3.

Embodiment 3

Figure 7:
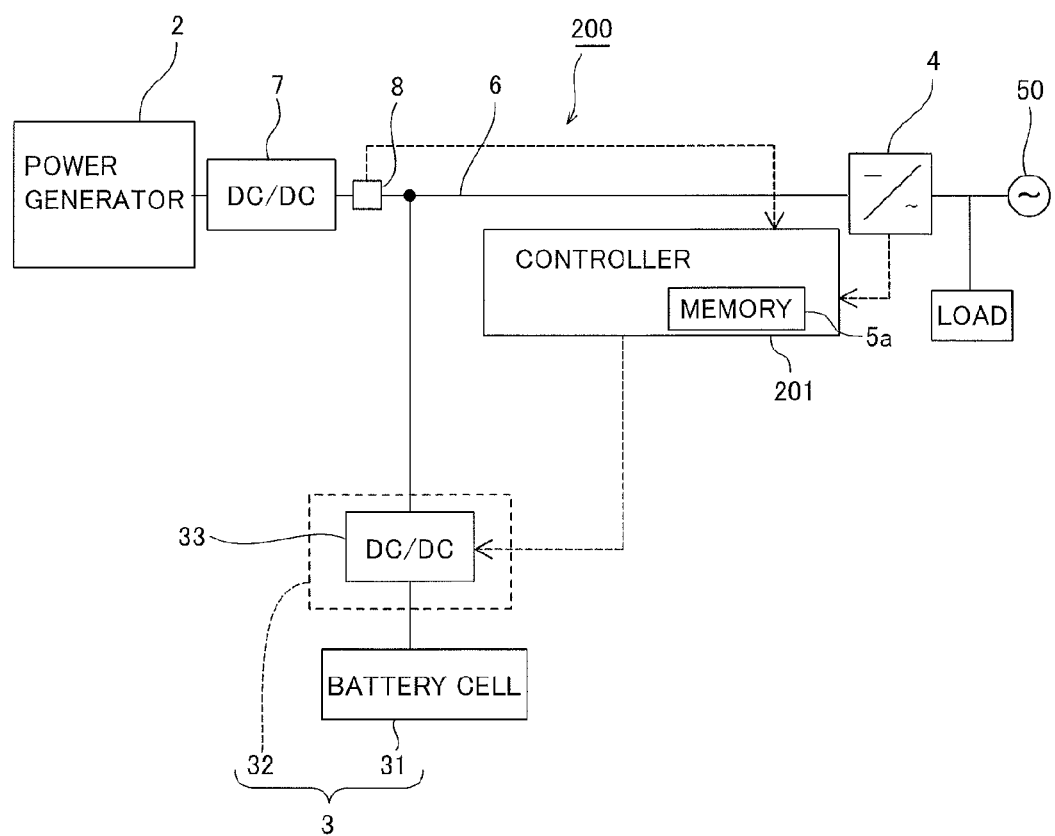
FIG. 7 is a block diagram showing the configuration of the power generation system of the third embodiment of the invention.
Figure 8:
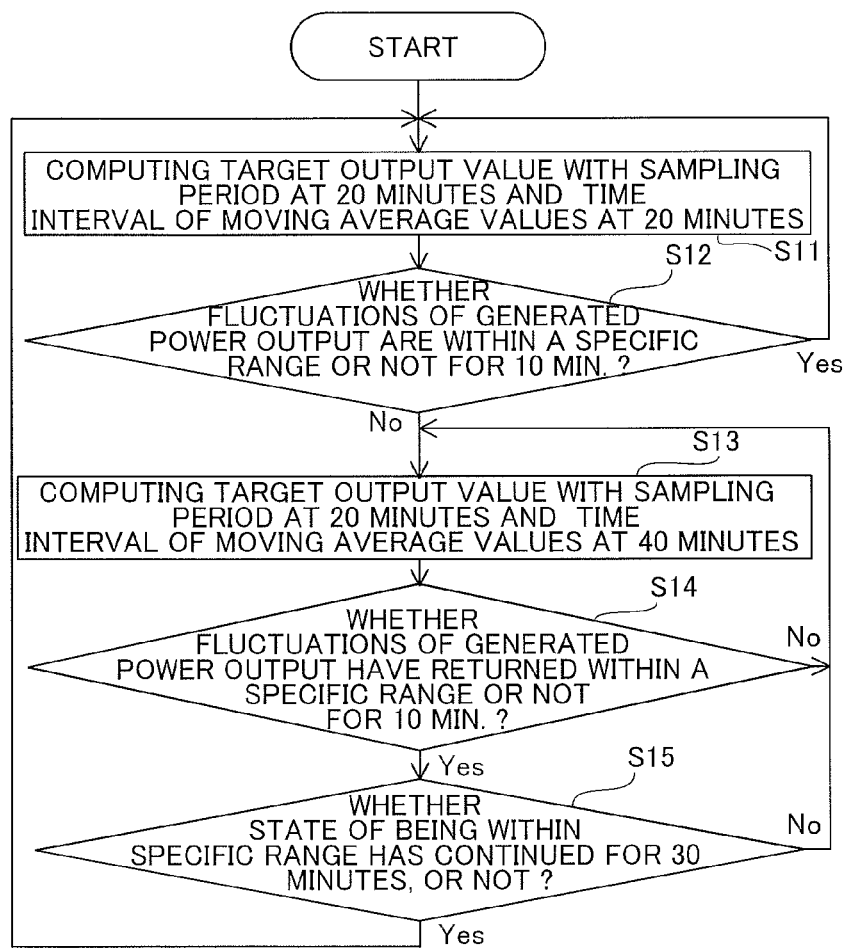
FIG. 8 is a flow chart in order to explain the flow of the control of the charge and discharge control of the power generation system in the third embodiment shown in FIG. 7.

Next, an explanation is provided concerning the power generation system 200 of the third embodiment of the present invention, while referring to FIG. 7 and FIG. 8. In this embodiment, unlike in embodiment 1, an example where the sampling periods are made longer when the fluctuations in the generated power are great is explained.

As shown in FIG. 7, the power generation system 200 provides a controller 201 instead of the controller 5 of embodiment 1. The configuration, other than the controller 201, is the same as the power generation system 1 of embodiment 1.

When the fluctuations in the generated power are within a specific range, the controller 201 computes the target output value by setting the sampling period at 20 minutes, and in order to compute the slope of the moving average values, the time interval between the moving average values is set at 20 minutes. Moreover, when the fluctuations in the generated power output are outside a specific range, the controller 201 computes the target output value with a sampling period of 20 minutes, and the time interval between the moving averages is extended to 40 minutes. The determination of whether the fluctuations in the generated power output are in a specific range, or not, is performed in the same manner as in embodiment 2.

Moreover, in the state where the time interval between the moving average values is extended to 40 minutes, when the fluctuations in the generated power output are in the state of being within a specific range for a specific time period (30 minutes in embodiment 2) in continuity, the controller 201 returns the time interval between the moving average values to 20 minutes. In relation to the controls, other than the switch-over of the time intervals of the moving average values interval in the charge and discharge control (the method of computing the target output value and the like), they are the same as in embodiment 1.

Next, an explanation is provided of the flow of control of the change-over control of the time interval between moving average values of the power generation system 200, while referring to FIG. 8.

Firstly, in Step S11, the controller 201 computes the target output value with the sampling period at 20 minutes, and the time interval between the moving average values at 20 minutes. Then in Step S12, the controller 201 makes a determination as to whether the fluctuations of the generated power output are within a specific range or not. In the event that the fluctuations in the generated power output are within the specific range, the controller 201 returns to Step S11, and performs charge and discharge control with a time interval between the moving averages of 20 minutes.

In the event that the fluctuations in the generated power output is not within the specific range, in Step S13, the controller 201 computes the target output value with the sampling period to 20 minutes, and the time interval of the moving average values at 40 minutes. In Step S14, the controller 201 makes a determination, with the time interval between the moving average values at 40 minutes, as to whether the fluctuations of the generated power output have returned to within a specific range or not. In the event that the fluctuations in the generated power output have not returned to within the specific range, the controller 201 returns to Step S13, and performs charge and discharge control with the time interval between moving average values of 40 minutes.

In the event that the fluctuations in the generated power output have returned to within the specific range, in Step S15, the controller 201 makes a determination as to whether the state of being within the specific range has continued for 30 minutes, or not. In the event that the fluctuations in the generated power output have not continued within the specific range for 30 minutes (The situation where the fluctuations in the generated power output exhibited an out-of-range event within the 30 minutes), the controller 201 returns to Step S13, and performs charge and discharge control with the time interval between moving average values of 40 minutes. Moreover, in the event that the state continued for 30 minutes, the controller 201 returns to Step S11, and performs charge and discharge control with the time interval between moving average values returned to 20 minutes.

The power generation system 200 of the present embodiment enables the derivation of the following benefits from the configuration described above.

In the event that the fluctuations in the generated power output are small, the controller 201 not only sets the time interval between the acquisition time of the moving average value A1 and the acquisition time point of the moving average value A2 with at 20 minutes, in the event that the fluctuations in the generated power output are great, the controller 201 sets the time interval between the acquisition time of the moving average value A1 and the acquisition time point of the moving average value A2 with at 40 minutes. By means of this type of configuration, because the computation time interval of the moving average values A1 and the moving average value A2 becomes longer when the fluctuations in the generated power output are great, the slope between the moving average value A1 and the acquisition time point of the moving average value A2 becomes gentler. By this means, by computing the target output value based on the slope computed by the moving average value A1 and the moving average value A2 with a longer period trend, even of the fluctuations in the generated power output are great, because the computation of the target output value is enabled without being swayed by the large fluctuations in the generated power output is enabled. By this means, even when the fluctuations in the generated power output are great, sufficient smoothing can be performed, in addition to, reducing the charge and discharge amount and depth of charge and discharge of the battery 3, enabling a contrivance at lengthening the lifetime of the battery 3.

The other benefits of embodiment 3 are the same as those for embodiment 1.

Figure 9:
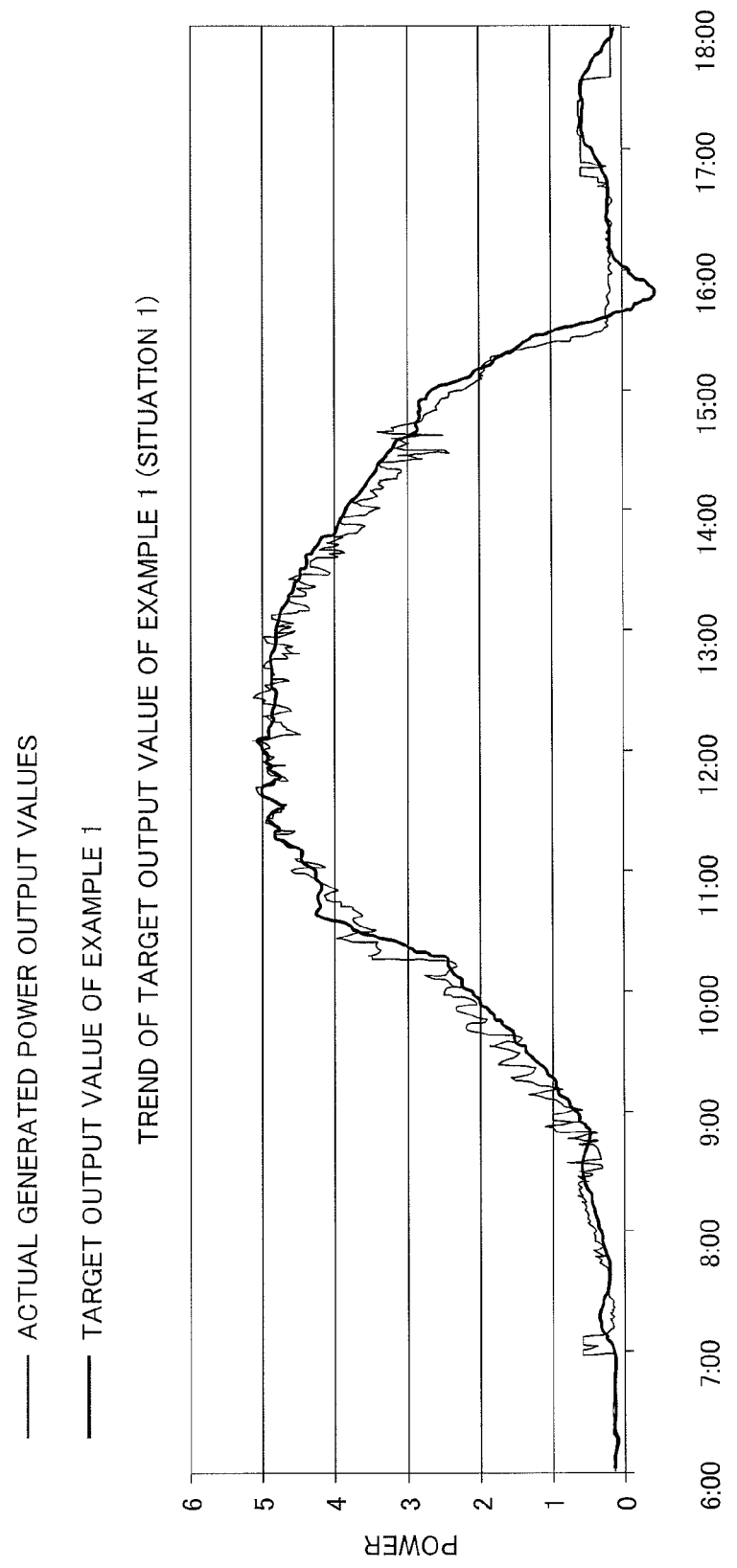
FIG. 9 is a graph showing one example of the one-day trend of the power generated by the power generator and the power output (situation 1) after smoothing by means of the example 1.
Figure 10:
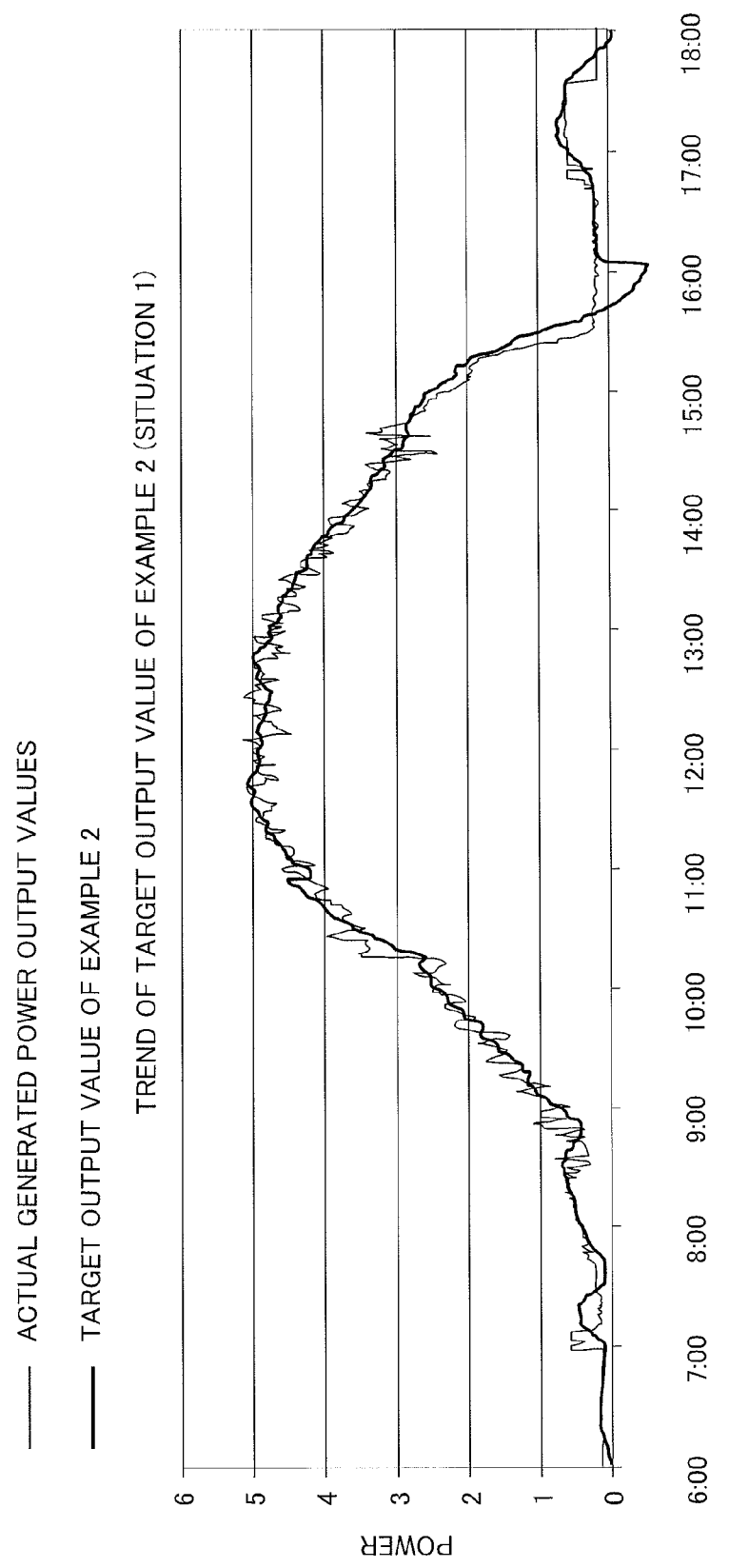
FIG. 10 is a graph showing one example of the one day trend of the power generated by the power generator and the power output (situation 1) after smoothing by means of the example 2.
Figure 11:
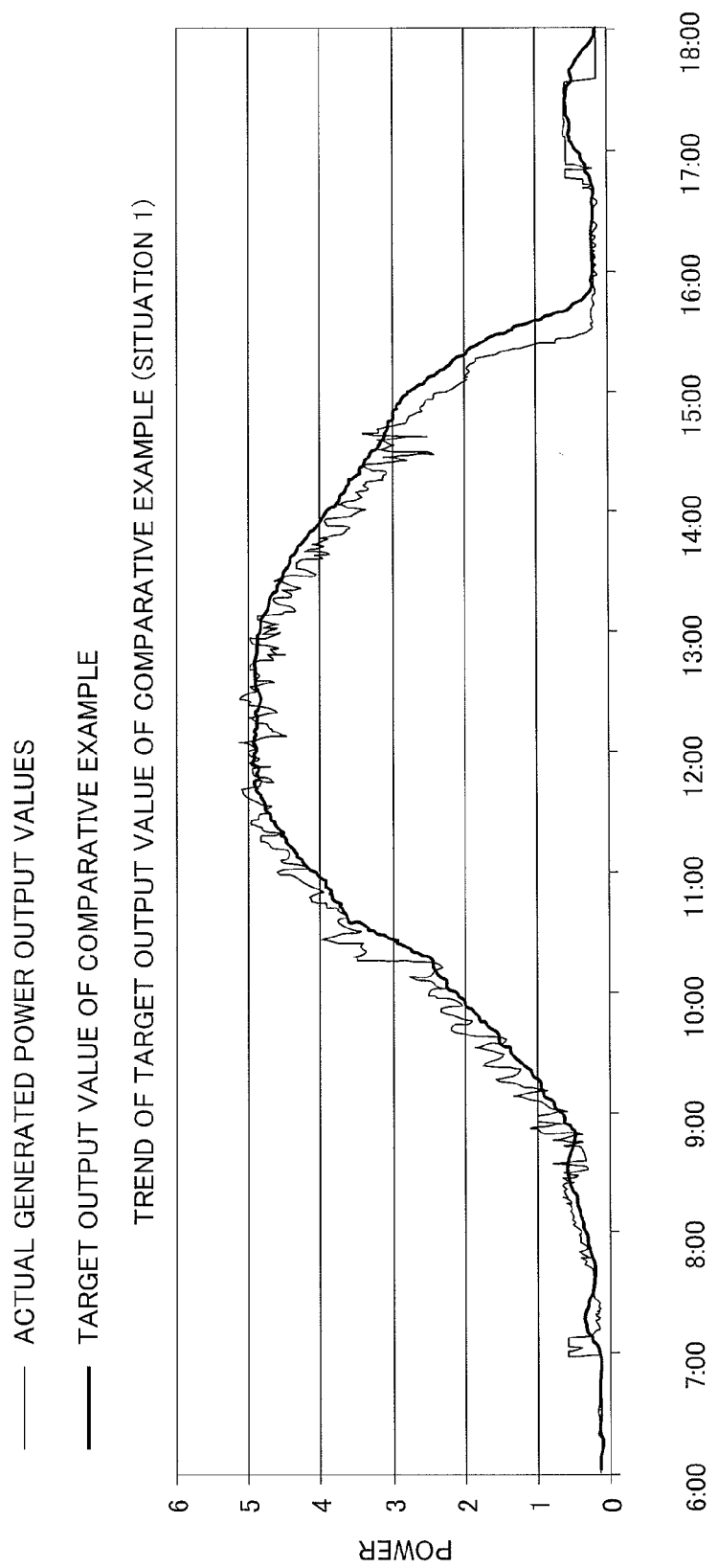
FIG. 11 is a graph showing one example of the one-day trend of the power generated by the power generator and the power output (situation 1) after smoothing by means of the comparative example.
Figure 12:
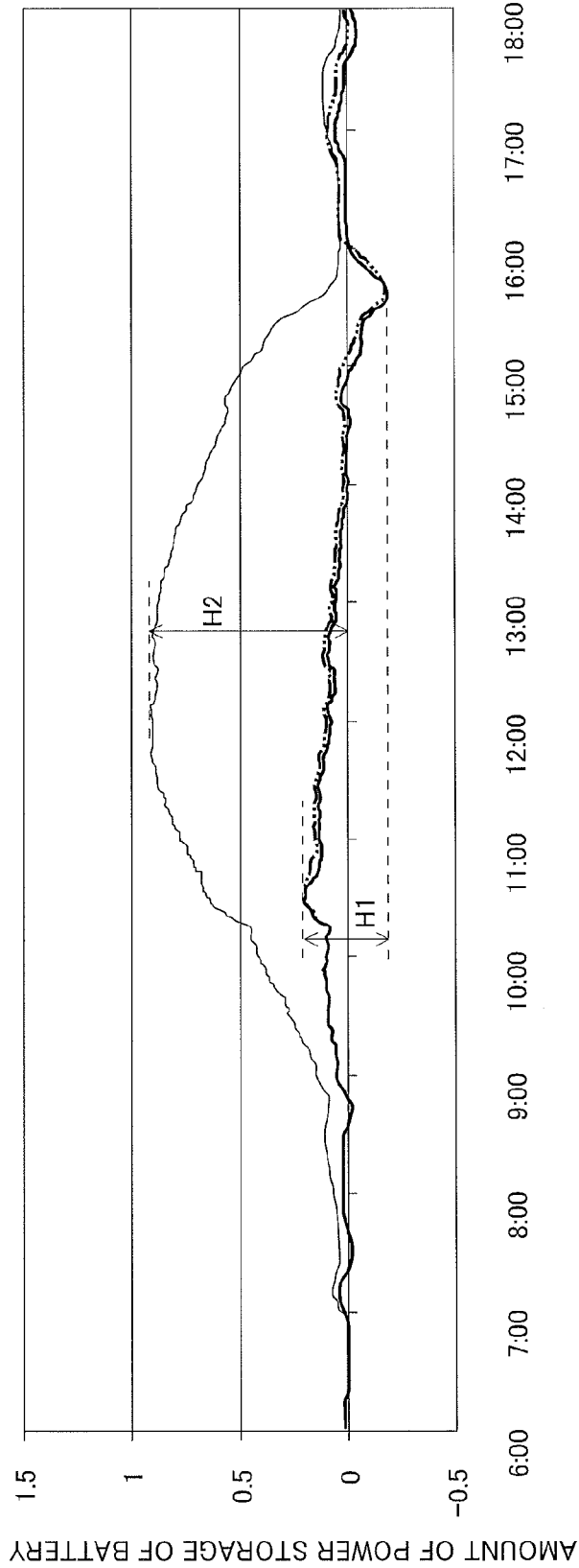
FIG. 12 is a graph showing the trends of the amount of power storage of the battery cell of the example 1, the example 2 and the comparative example (situation 1).
Figure 13:
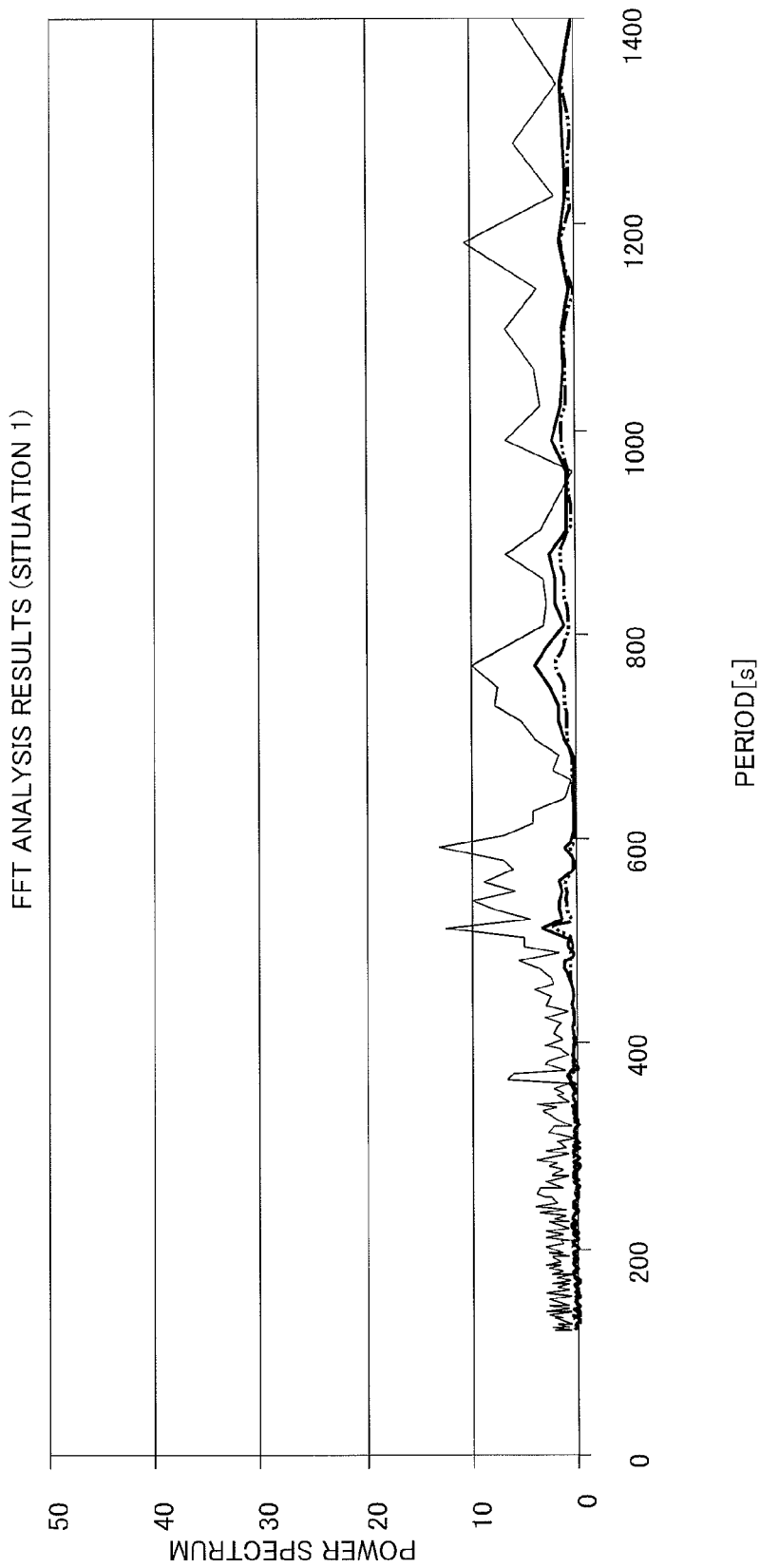
FIG. 13 shows a graph of the FFT analysis results (situation 1) of the example 1 and the comparative example.

Next, the simulation results proving the effectiveness of the performance of the charge and discharge control of the present invention (situation 1) are explained while referring to FIG. 9·FIG. 13. In situation 1, the trends in the power output over one cloudless sunny day of a power generator in example 1, and in example 2 and the comparative example, and the results of a simulation of the performance of smoothing as a result of the charge and discharge control on the generated power output are shown. Now, the example 1 is an example of the performance of the charge and discharge control of embodiment 1 (sampling period 20 minutes, time interval between the moving average values of 20 minutes). Example 2 is an example of the performance of the charge and discharge control of embodiment 2 (sampling period switchover 20/40 minutes, time interval between the moving average values of 20 minutes). The comparative example is an example of the performance of the charge and discharge control using the moving average value, as is, as the target output value. In FIG. 9, FIG. 10 and FIG. 11, respectively, the trends of the generated power output and the power output of example 1, the trends of the generated power output and the power output of example 2, and the trends of the generated power output and the power output of the comparative example are shown. Moreover, in FIG. 12, the trends of the amount of charge to the battery cell in examples 1, example 2 and the comparative example for situation 1 are represented. Now in explaining fluctuation in the amount of charge in respect of the initial period, the initial value for the amount of charge is shown as 0 in FIG. 12, but this does not represent the situation where the initial value of the amount of charge is 0 Wh. FIG. 13 shows a graph of the FFT analysis results (situation 1) of the example 1 and the comparative example. Now example 2 is not represented in FIG. 13, but because the fluctuation in the amount of power generated over a day is small in a fine day just as in example 1, even if control is performed in example 2 with the sampling period for the fluctuations in the generated power output extended, the results were substantially the same as in example 1.

As shown in FIG. 9~FIG. 11, in respect of each of example 1, 2 and the comparative example, it can be appreciated that smoothing was achieved in respect of the generated power output. Moreover, as shown in FIG. 11, in the charge and discharge control of the comparative example, it can be appreciated that in the situation where the generated power output was rising during the morning, the trend of the values is smaller than the trend of the actual power generated, and in the afternoon when the generated power output was on a downward trend, the trend of the values is greater than the trend of the actual power generated. In other words, in the comparative example, where the moving average value is used, as is, as the target output value, because the target output value is retarded toward the past actual generated power output values, the trend of the target output value is delayed with respect to the trends of actual generated power output.

Here, as shown in FIG. 9, the target output value of the first example is nearer to the trend of the actual generated power output than in the comparative example. Moreover, as shown in FIG. 10, the target output values of the example 2 is nearer to the trend of the actual generated power output than either of the example 1 or the comparative example.

Furthermore, as shown in FIG. 12, in the comparative example, the amount of power charged simply increases from the initial value during the morning, and during the afternoon the amount of power charged simply decreases. This is because, as shown in FIG. 11, in the comparative example, the target output value trend lags the actual generated power output overall, such that during the morning the trend of the target output value is for a smaller value than the actual generated power output, and in the afternoon the trend of the target output value is for a greater value than the actual generated power output. On the other hand, in both examples 1 and 2, irrespective of whether it was morning or afternoon, there was a repeated increase and decrease with respect to the initial value. This is because in example 1 and example 2, the hysteresis between the target output value and the actual generated power output, as seen in the comparative example, was suppressed, and there was alternative repeated charging and discharging. Here, it can be appreciated that the fluctuations in the capacity of the battery cells in example 1 and example 2 are greatly reduced when compared to the comparative example. Specifically, the degree of charge and discharge depth H1 in example 1 and example 2 was greatly reduced, compared to the depth of charge and discharge H2 seen in the comparative example. Moreover, it can be appreciated that the amount of charging and discharging in example 1 and example 2 was very much less than in the comparative example. By this means, in example 1 and example 2, not only is charge and discharge control enabled using a battery cell with a lower capacity, compared to the comparative example, a contrivance at lengthening the lifetime of the battery cell is enabled.

Moreover, in example 1 and example 2, because the peak value for charging (maximum value) was much less than in the comparative example, even when the initial state of charge (SOC) was higher, the situation where full charge is reached during charge and discharge control can be suppressed. By this means, because the initial charged state can be elevated (the nighttime charged state), in the event that there is a power outage or disaster, etc. during the night, the supply of even more power from the battery cell can be utilized. Moreover, even in example 1, just as with the comparative example, the charged state at the start of the day and at the end of the day can be substantially the same.

Furthermore, as shown in FIG. 13, in example 1 and example 2, the fluctuation periods in the actual power generated could be suppressed overall. In particular, it can be appreciated that the components of the fluctuation periods which the load frequency control can deal with (Approximately 2 minutes (approximately 120 seconds) approximately 20 minutes (approximately 1200 seconds)) are sufficiently suppressed.

Next, the simulation results proving the effectiveness of the performance of the charge and discharge control of the present invention (situation 2) are explained while referring to FIG. 14~FIG. 18. In situation 2, a graph showing one example of the one-day trend of the power generated by the power generator on a sunny day with clouds is explained for example 1, example 2 and the comparative example, and the power output (situation 2) after smoothing is proven. FIG. 14~FIG. 18 show the same type of simulation results as shown in FIG. 9~FIG. 13.

Figure 14:
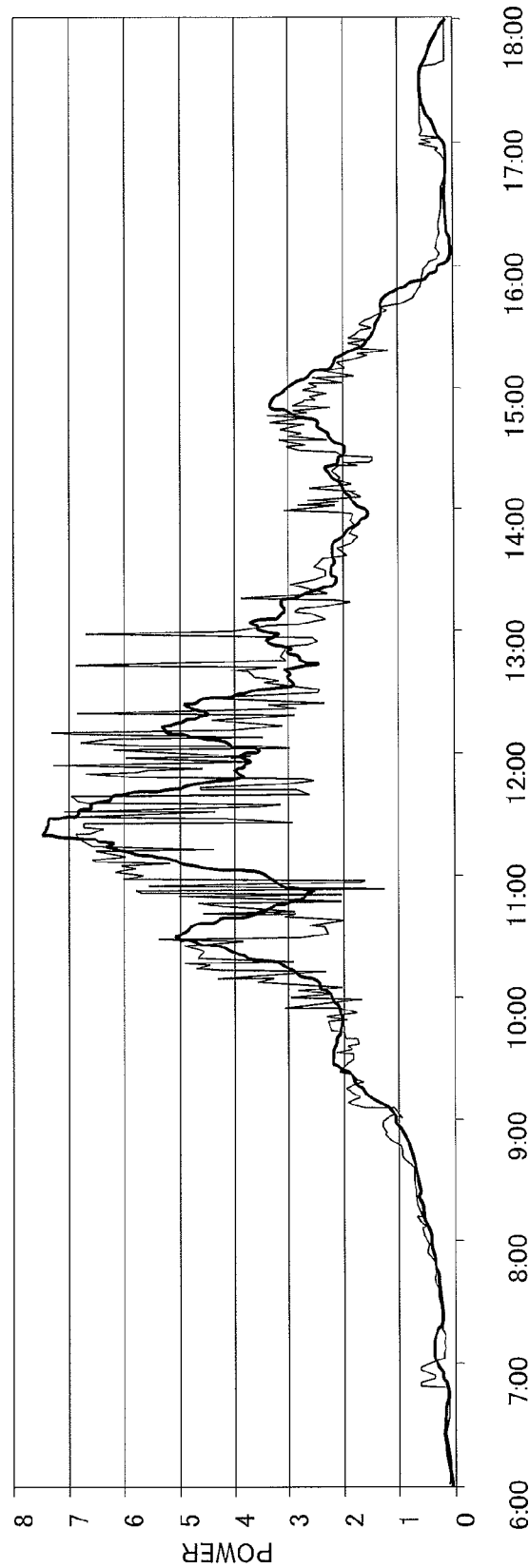
FIG. 14 is a graph showing one example of the one-day trend of the power generated by the power generator and the power output (situation 2) after smoothing by means of the example 1.
Figure 15:
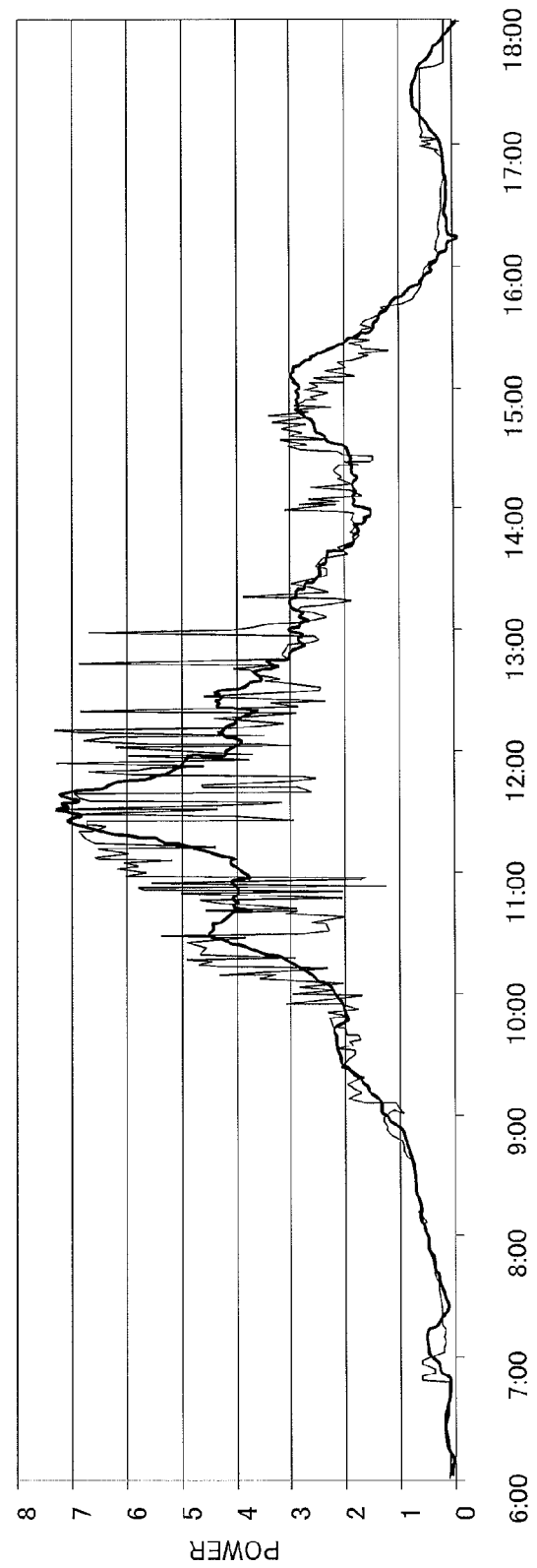
FIG. 15 is a graph showing one example of the one-day trend of the power generated by the power generator and the power output (situation 2) after smoothing by means of the second embodiment.
Figure 16:
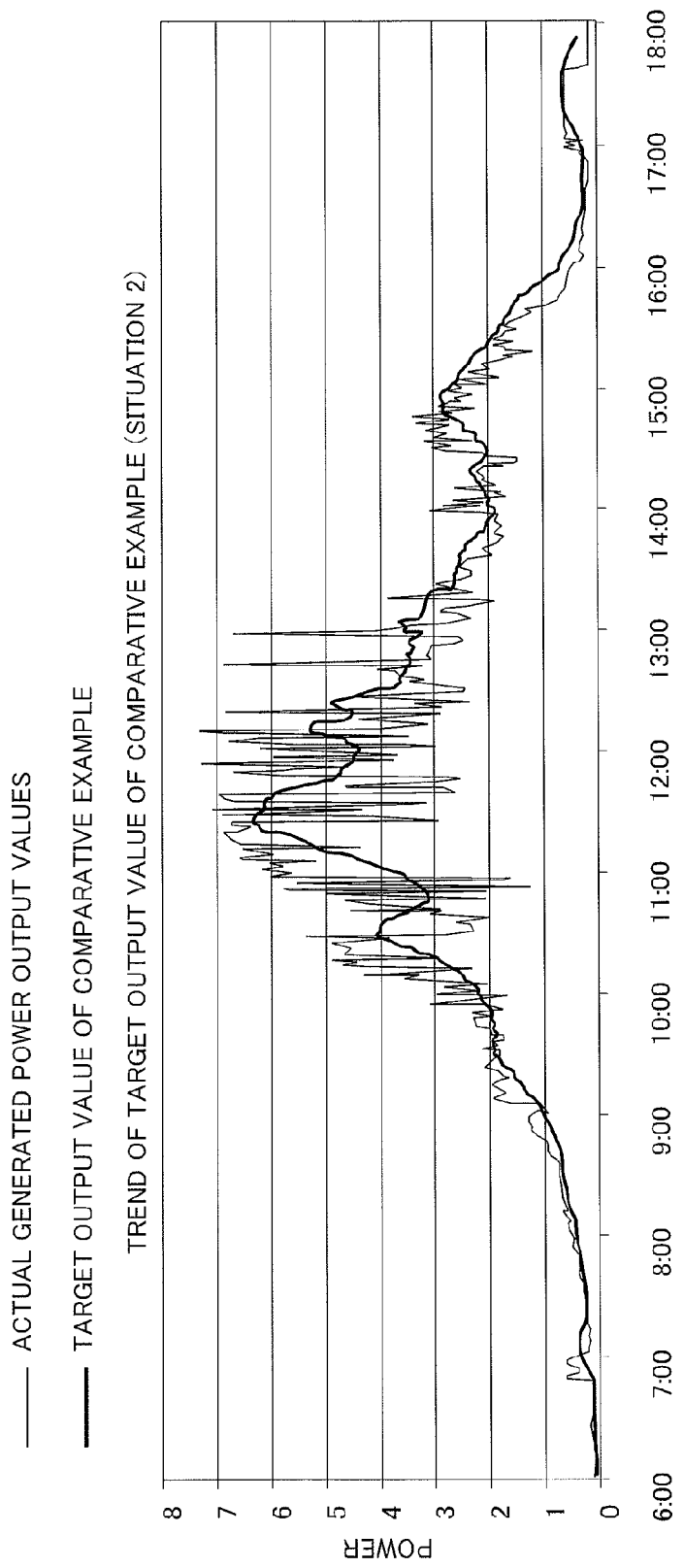
FIG. 16 is a graph showing one example of the one-day trend of the power generated by the power generator and the power output (situation 2) after smoothing by means of the comparative example.

As shown in FIG. 14~FIG. 16, it can be appreciated that the fluctuation in the generated power output on a fine day with clouds is great, but even on a fine day with clouds, it can be appreciated that smoothing of the actual generated power was enabled in examples 1, 2 and the comparative example. Moreover, it can be appreciated that, as shown in FIG. 17, the fluctuations in the capacity of the battery cell were remarkably reduced when compared with the comparative example. Specifically, the depth of the charge and discharge H3 in example 1 and the depth of the charge and discharge H4 in example 2 were greatly reduced, compared to the depth of the charge and discharge H5 in the comparative example. In other words, in the event that the fluctuations in the generated power output are great, it can be appreciated that the control of the present invention is effective. Moreover, the charge and discharge amount in example 1 and example 2 were greatly reduced, compared to the charge and discharge amount in the comparative example.

Furthermore, as shown in FIG. 18, the fluctuation periods of the actual generated power were suppressed overall in examples 1, 2 and the comparative example. Here, in example 2, it can be appreciated that in example 2, there is substantially the same level of smoothing as in the comparative example. In other words, in example 2, while performing substantially the same level of smoothing, the depth of the charge and discharge is smaller than in the comparative example.

Now the embodiments and examples disclosed here should be considered for the purposes of illustration in respect of all of their points and not limiting embodiments. The scope of the present invention is represented by the scope of the patent claims and not the embodiments described above, in addition to including all other modifications which have an equivalent meaning and fall within the scope of the patent claims.

Furthermore, in the embodiments 1~3 described above, an explanation was provided whereby the power consumption in the consumer home was not taken into consideration in the load in the consumer home, but this invention is not limited to this, and in the computation of the target output value, a power is detected wherein at least part of the load is consumed at the consumer location, and the computation of the target output value may be performed considering that load consumed power output or the fluctuation in the load consumed power output.

Furthermore, in the embodiments 1~3 described above, examples were disclosed wherein specific numerical values were disclosed in relation to the sampling periods, the bus voltages and the like, but this invention is not limited to these, and they may be modified as appropriate.

Moreover, in the embodiments 1~3 described above, examples were described where a determination was reached on the slop of the increase or decrease between the moving average values between two points in time (The tendency for the generated power to increase or decrease), but this invention is not limited to these, and a determination based on the trend slope (the slope of the increase or the decrease in the generated power) to increase or decrease based on three or more points in time of the moving average may be employed.

Furthermore, in the embodiments 1~3 described above, an explanation was provided whereby in order to compute the moving average value A1 at the current time (Time t), the center point (t-T3/2) of the moving average time interval (time t-T3~time t) was used as the starting point on the occasion of computation of the slope S of the trend of the target output value G, but this invention is not limited to this, and anywhere in the vicinity of the center of the moving average interval may be employed. Moreover, instead of the vicinity of the center of the moving average interval, a starting point before the setting of the target output value, in addition, if a starting point is set within the moving average interval is employed, then a target output value is enabled which has a lesser overall difference from the actual generated power output than if only the moving average is used as the target output value.

Moreover, in the embodiments 2 and 3 described above, an explanation was provided whereby when the 10-minute fluctuation in the generated power output fell outside the specific range, the time interval of the sampling period or the time interval between the moving averages used to compute the slope were made larger, but this invention is not limited to this, but if a determination is enabled that the fluctuation in the power output is great, any index may be used. Furthermore, on days where the fluctuations in the generated power output are expected to be large, based on the weather forecast or the weather conditions for the installed location, charge and discharge control may be performed where the time interval between the moving average values in order to compute the slope or the sampling period may be set larger from the beginning.

Moreover, in the embodiments 1~3 described above, an example was explained wherein a moving average value was computed as one example of the "average power value" of this invention, but this invention is not limited to this, and a value computed for the 'average power value' using the first order time lag method (time lag of the first order method) may be employed. The first order time lag method is a method where a specific time constant T divided by a value for the detection time interval $\Delta t$ is set as N (the number of data elements of the power output data W included in time T), and the difference between the previously computed value $Q(t-\Delta t)$ and the power output data Wt at time t is divided by N, then the value Qt at time t is computed by adding the above-described difference divided by N to the previously computed value $Q(t-\Delta t)$. Because the computed value Qt by this first order time lag method can also be used the value that the difference between the computed value of $Q(t-\Delta t)$ and the power output data Wt at time t is divided by N, Qt is the smoothed value of the fluctuation of the generated power output. Moreover, the computed value Qt, just like the moving average values, is a value which is delayed with respect to the trend of the actual generated power output. Such that, even when smoothing is performed using these types of first order time lag methods, by the application thereof to the setting of the target output value in this invention, a contrivance at lengthening the lifetime of the battery is enabled, while suppressing the effect on the power grid caused by the fluctuations in the power generated by the generator.

The invention claimed is:

1. A method of controlling a battery storing electric power generated by a power generator generating electric power using renewable energy, comprising:

detecting an amount of electric power generated by the power generator at a first time and a second time that is prior to the first time;

computing a rate of increase or decrease of the amount of electric power between the first time and the second time;

computing a target output value for the electric power to be supplied to an electric power transmission system based on the rate, and supplying to the electric power transmission system electric power corresponding to the target output value from at least one of the power generator and the battery.

2. The method of claim 1, further comprising computing a first average power value of the amount of electric power generated by the power generator in a later period between the first time and a time prior to the first time, and computing a second average power value of the amount of electric power generated by the power generator in an earlier period between the second time and a time prior to the second time, wherein the rate is determined based on a difference between the first average power value and the second average power value and a difference between the first time and the second time.

3. The method of claim 2, wherein the detection of the amount of electric power generated by the power generator is performed a plurality of times in both the later period and the earlier period, wherein the first average power value is computed based on the amounts of electric power detected in the later period, and the second average power value is computed based on the amounts of electric power detected at the earlier period.

4. The method of claim 3, further comprising computing, every time the detection is performed, an average power value over a period between the detection and a time prior to the detection by a predetermined amount.

5. The method of claim 2, wherein a specific point in the later period is set as a standard time, and a change in electric power from the first average power at the rate of increase or decrease from the standard time to a time of the computation of the target output value is set as the target output value.

6. The method of claim 5, wherein the standard time is a midpoint of the later period.

7. The method of claim 5, wherein the first average power value is an average power value computed immediately prior to the time of the computation of the target output value.

8. The method of claim 2, wherein the later period and the earlier period are greater than an upper limit of a fluctuation cycle that can be controlled by a load frequency control.

9. The method of claim 2, wherein the later period, the earlier period or the difference between the first time and the second time is modified based on a fluctuation of the amount of electric power generated by the power generator.

10. The method of claim 9, further comprising computing an amount of fluctuation of the amount of electric power generated by the power generator in a predetermined period, and determining whether the amount of fluctuation is within a predetermined range, wherein, when the amount of fluctuation is within the range, the later period and the earlier period are made shorter than when the amount of fluctuation is not within the range.

11. The method of claim 9, further comprising computing the amount of fluctuation of the amount of electric power generated by the power generator in a predetermined period, and determining whether the amount of fluctuation is within a predetermined range, Wherein, when the amount of fluctuation is within the range, the difference between the first time and the second time is made shorter than when the amount of fluctuation is not within the range.

12. The method of claim 1, wherein the second point is prior to the first point by an amount more than an upper limit of a fluctuation cycle that can be controlled by a load frequency control.

13. A non-transitory computer-readable recording medium which records a control program for causing one or more computers to perform the steps comprising:

detecting an amount of electric power generated by the power generator at a first time and a second time prior to the first time;

computing a rate of increase or decrease of the amount of electric power between the first time and the second time;

computing a target output value for the electric power to be supplied to an electric power transmission system based on the rate; and supplying to the electric power transmission system electric power corresponding to the target output value from at least one of the power generator and the battery.

14. An electric power generation system, comprising:

a power generator configured to generate electric power using renewable energy;

a battery configured to store electric power generated by the power generator;

a detector configured to detect the amount of electric power generated by the power generator at a first time and a second time prior to the first time;

a controller configured to compute a rate of increase or decrease of the amount of electric power between the first time and the second time, to compute a target output value for the electric power to be supplied to an electric power transmission system based on the rate, to supply to the electric power transmission system electric power corresponding to the target output value from at least one of the power generator and the battery.

15. A device controlling a battery storing electric power generated by a power generator generating electric power using renewable energy, comprising:

a detector configured to detect an amount of electric power generated by the power generator at a first time and a second time prior to the first time;

a controller configured to compute a rate of increase or decrease of the amount of electric power between the first time and the second time, to compute a target output value for the electric power to be supplied to an electric power transmission system based on the rate, to supply to the electric power transmission system electric power corresponding to the target output value from at least one of the power generator and the battery.

* * * * *